Feb. 18, 1941.   A. RONNING   2,232,275
VEHICLE
Filed July 18, 1938
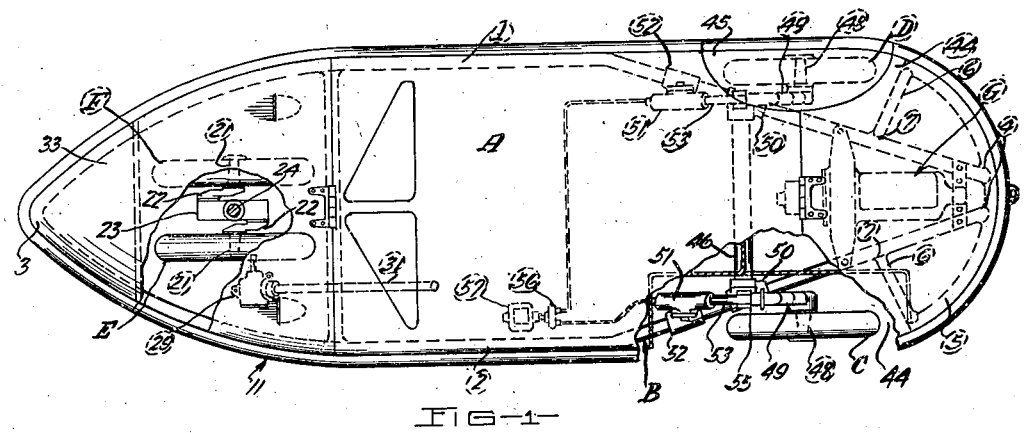
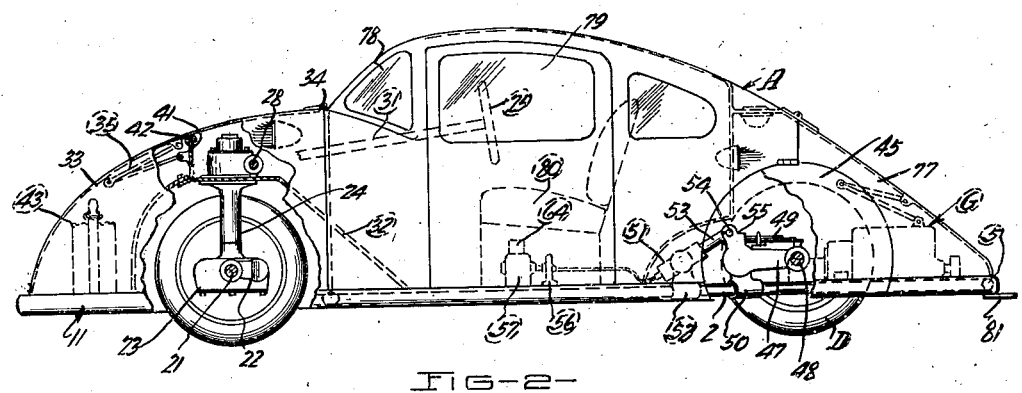
INVENTOR
ADOLPH RONNING
BY
ATTORNEY Patented Feb. 18, 1941

2,232,275

UNITED STATES PATENT OFFICE 2,232,275

VEHICLE

Adolph Ronning, Minneapolis, Minn.

Application July 18, 1938, Serial No. 219,675

3 Claims. (Cl. 180—1)

This invention relates to vehicles of the automotive type.

The present day automobile, as it is commonly termed, is obviously a far cry from its progenitor, the horseless carriage, and tremendous improvements have been made insofar as power, convenience, and appearance are concerned. However, in some respects very little changes have been made, and this is particularly noted in the frame construction and wheel suspension. The front and rear wheels are still arranged to track or follow the same path, as was perhaps necessary in the times of rutted roads, but which in this era of hard surfaced highways are hardly necessary. The main frame or chassis has generally been arranged within the wheels in order to give them room to turn, and to complete the body it has been necessary to use relatively fragile fenders and running boards. As a result these parts are frequently crushed, and in addition they represent obstructions or projections which prevent the securing of a true, streamlined shape for the vehicle.

In addition to the foregoing, the drive is invariably made to either the rear or the front wheels, and it has been necessary that these wheels be relatively rigidly connected to the chassis. This is perfectly satisfactory while traveling in a straight path, but in making a turn the natural tendency of the vehicle to sway or careen outwardly frequently displaces the center of gravity to such extent that the vehicle turns over.

Having in mind these facts, it is the primary object of my invention to provide a vehicle overcoming the objectionable features recited, and in which the frame and body construction, the wheel suspension, and the driving assembly, are all combined in a novel and advantageous way to provide a vehicle of a true streamlined shape, and one which is safer to operate at all times, and has considerably more interior or body room.

Another object is to provide an improved vehicle assembly wherein a tubular frame may be used, and arranged to follow the outer contour or margin of the body in order to afford the mechanism of strength and lightness, and to so position the frame that it will best resist any shocks or jars due to collision with any vehicle or any obstruction.

The foregoing arrangement also lends itself well to the provision of a body of a forwardly tapering and pointed shape designed to avoid in most cases head on collision with any obstruction, and to facilitate its travel over the road due to lowered air resistance.

A further object is to provide an improved wheel suspension assembly in which the front or steering wheels are relatively closely spaced so that they may be enclosed wholly within the confines of the frame to facilitate steering and to prevent injury to these wheels. The type of front wheel assembly and support is quite similar to that disclosed in my copending application for patent on Mounting for vehicle wheels, filed under date of July 15, 1938, and given Serial No. 219,369; and the wheels are supported by crank means in such manner that differential vertical action may be had in order to maintain the lateral stability of the vehicle should either wheel meet an inequality in the road surface.

Another object is to provide in connection with the improved wheel suspension assembly, an improved arrangement of the rear or traction wheels, in which these wheels are individually supported from the frame and arranged also for differential vertical displacement in the manner recited in my copending application for patent on Vehicle suspension means, filed May 21, 1938, under Serial No. 209,282.

A further object is to provide improved drive means for vehicles of this kind, in which each wheel is driven by its individual motor or power unit. These units may take the form of electric motors which are energized by a common power plant carried in the vehicle and which are reversible in such manner that the vehicle may be operated either forwardly or backwardly, and either the front or the rear wheels may be operated while the other remains stationary. The latter feature is of particular importance in parking the vehicle, inasmuch as the front wheels may be turned at right angles to the vehicle and operated to swing the front end inwardly into the selected parking space.

Still a further object is to provide a vehicle having a body of improved design and arrangement wherein the power plant is arranged at the rear so that no heat or fumes may reach the occupants, and leaving the frontal portion of the body clear for the arrangement of the front wheels therein and the storing of tools, luggage, etc.

These and other more detailed and specific objects will be disclosed in the course of the following specification, reference being had to the accompanying drawing, in which—

Fig. 1 is a plan view of the vehicle constructed in accordance with my invention, and with parts of the body broken away to disclose interior construction.

Fig. 2 is a side elevation also with front and rear parts broken away to better disclose the wheel mounting assembly.

Referring more particularly and by reference characters to the drawing, A designates the body of the vehicle as formed around and supported by a frame or chassis B. The latter is of tubular material, including the side portions 1 and 2, which converge forwardly to a relatively sharp nose portion 3, and also converge rearwardly and straightly to their connection at 4 with an arcuate rear member 5, the frontal ends 6 of which are turned inwardly and secured at 7 to said rearwardly converged portions. This assembly provides a frame having the desired characteristic of lightness and strength, and is well adapted by its truss like arrangement to resist the shocks and stresses due to collision with any obstruction, and the various connections at 4 and 7 may be welded to provide further strength.

The body A may be fabricated from sheet metal, and around its lower edge is secured to the frame and has a bumper 11 extending entirely around the outside of its lower edge to protect it from injury.

The vehicle is supported upon rear wheels C and D and front wheels E and F, and the front wheel assembly will be first described. As heretofore stated, this assembly is quite similar to my copending application for patent on mounting for vehicle wheels, and reference is invited to that disclosure for comparative purposes. The wheels are disposed in relatively close spacing inwardly of the frame B, and are journaled upon axles 21 which are formed as a part of the crank acting members 22. These members 22 are journaled at the opposite ends of a housing 23 which is rigidly supported at the lower end of the steering post 24, and are movable about a vertical axis for steering purposes under control of the steering wheel 25. For this purpose the upper end of the steering post 24 has a worm gear and worm (not shown) operated by a shaft 28 leading outwardly to a housing 29 wherein it is connected by bevel gears (not shown) to the steering column or shaft 31 in such manner that manipulation of the steering wheel 25 will cause the desired rotation or oscillation of the steering post. The crank members 22 inwardly of the housing 23 are linked together in such manner that the wheels E and F are connected with a differential action, and as either moves upwardly on its crank member, the other will move downwardly an equal amount. This action is wholly under control of inequalities of the road surface, and also is brought into effect should the vehicle tip laterally to either side. Accordingly, when either wheel meets with a rise or ridge in the surface over which it is traveling, it will be raised upwardly thereby, and the other wheel will be moved downwardly so that the vehicle will maintain a substantially even heighth and without any lateral tipping action whatever.

The axles 21, as stated in my copending application hereinbefore referred to, incline downwardly slightly toward their ends, in order to provide the desired camber of the front wheels necessary for steering, and this arrangement also provides a very desirable action in the operation of the vehicle, as will hereinafter be described.

The steering post 24 is supported by a housing 32 which extends upwardly from the frame B over the front wheel assembly, and access to the wheels for tire changing or any other purpose is had through a movable hood portion 33 of the body A. This hood portion may be hinged at 34 to swing upwardly at its forward end, may be retained in its open position by the conventional arm assembly 35, and may be held in its locked and closed position by a suitable latch (not shown). A portion of the housing 32, as designated at 41, extends upwardly to form a medial bearing point for the hood 33, and has a rubber or resilient guard member 42 which bears against the hood and prevents rattling.

The foregoing arrangement also provides a very convenient storage for luggage or other articles, as designated at 43.

The rear wheels C and D are disposed in the recesses designated generally at 44, formed forwardly of the inturned ends 6 of the frame and immediately outwardly of the converging rear ends of the frame. In this manner the wheels are located entirely within the confines of the frame and body as a whole, and access may be made to these wheels for tire changing and repair through removable sections 45 of the body. These removable sections 45 may be hinged in place and retained by latches, (not shown), or may be entirely removable as may be desired.

The wheels are connected and supported by the frame B by mechanism similar to that described in my copending application for vehicle suspension means previously identified, and to which reference is invited for complete details as to the construction. As here employed, this mechanism comprises a tubular member or torque tube 46 extended transversely across the frame and which forms journals for the inner ends of the crank members 47. The said crank members 47 have outwardly turned axles 48 upon which the wheels C and D are journaled, and the free ends of the members bear upwardly against leaf springs 49 supported by brackets 50 on the frame B, and which springs serve to normally and yieldably prevent upward movement of the cranks such as would lower the vehicle. However, the crank members 47 may be raised or lowered by means of hydraulic jacks 51 supported by brackets 52 to the frame, and having their plungers 53 pivotally connected at 54 to arms 55 extended from the cranks. These jacks 51 are operated hydraulically under control of a pump 56 which is driven by an electric motor 57, and are so arranged that as one jack is operated to urge its plunger 53 rearwardly and accordingly move the crank 47 downwardly, the other will have its pressure relieved in such manner that its crank 47 may move upwardly against the spring 49 an equal amount. The result of this action is to elevate one side of the vehicle while lowering the other, or the action may be reversed simply by reversing the direction of operation of the pump 56 and motor 57. For this purpose I employ a reversible motor so that by reversing the polarity thereof the desired action may be obtained.

For driving the wheels and the vehicle as a whole, I may provide individual electric motors (not shown) for each wheel of heavy duty reversible type and having a high starting torque in order to start the vehicle from a standing position. Power for the operation of these motors is provided by the power plant G located at the rear and which may include a Diesel motor and generator suitably connected and arranged to generate sufficient current for opeartion of all the motors and various other electric parts of the vehicle.

The individual suspension and driving of the wheels permits the use of controls of various kinds for lateral stabilization of the vehicle as will be evident, and in connection with this lateral stabilization of the vehicle, which acts to counteract centrifugal force in making a turn, the particular arrangement of the front wheels E and F for toe-in on their respective cranks 32 also provides an advantageous action. These wheels of course move upwardly and downwardly with the differential action; and in their normal positions the wheels E and F are caused to camber or incline inwardly toward their inner sides. In making a turn then, in either direction, the front wheel which is outermost in making the turn, will be moved upwardly by the action of the rear wheels, and the wheel which is innermost will be moved downwardly an equal amount. The slight angular relationship between the axles 21 for the front wheels, as described, will then incline these wheels slightly from the vertical outwardly and forwardly in the direction in which the turn is made. In other words, the wheels may be set to be cocked against the turn to have a slight lead inwardly with respect to the direction of travel, and this effect, while necessarily slight, nevertheless at high speed particularly will serve to prevent side draft of the frontal end of the vehicle, and will greatly facilitate steering.

The rear portion of the body A may have a hinged hood 77 similar to the hood 33, and which may be raised for inspection and servicing of the power plant G.

The body A furthermore may have the usual windshield 78, side doors 79, and various other more or less conventional parts, but it will be readily evident that due to the fact that the body extends outwardly to the outermost confines of the frame B, the entire width may be used for the seat 80.

A trailer hitch 81 may be secured or welded to the rear portion of the frame B for connection to a trailer or following vehicle of any kind.

From the foregoing it will be apparent that I have provided a vehicle of attractive form and which will be safe to operate at all times. The sharply pointed frontal end of the vehicle will prevent in most cases the direct collision of any obstructions, and such shock as may occur from collision will be distributed and absorbed by the frame without injury to the body. The rear wheels are spring suspended as described, and the front wheels may also be spring supported by utilizing the particular form of differential mounting shown in Figs. 8 and 9 of my copending application for Mountings for vehicle wheels hereinbefore referred to. It is thought that further details as to the operation, and possible ways and means of operating the various electric circuits will be understood without further description herein.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle, a frame comprising side members and having rear end portions converging rearwardly to bring their extremities into close spacing at the rear of the vehicle, an arcuate rear member secured intermediate its ends to the rear extremities of the side members and extending outwardly and forwardly therefrom, end members secured angularly between outer ends of the rear member and the converging portions of the side members forwardly of the rear ends thereof and thereby defining angular, laterally located wheel mounting spaces forwardly of said end members and outwardly of converging portions of the side members, and ground wheels arranged in said spaces in supporting connection with the frame.

2. In a vehicle frame and wheel assembly, a pair of side members disposed for a part of their length in substantially parallel, transversely spaced positions and having rear end portions converging rearwardly to draw the extremities thereof into proximity to each other, a rear member secured rigidly at its center to said rear extremities and extending outwardly at its ends therefrom, end members extended between the outer ends of the rear member and the converging portions of the side members and rigidly secured at their ends thereto to thereby brace the ends of the rear member against displacement relative to said side members, and supporting wheels connected to the frame and disposed outwardly of the converging portion of the side members and forwardly of the said end members.

3. In a vehicle frame and wheel assembly, a pair of side members disposed for a part of their length in substantially parallel, transversely spaced positions and having rear end portions converging rearwardly to draw the extremities thereof into proximity to each other, a rear member secured rigidly at its center to said rear extremities and extending outwardly at its ends therefrom, end members extended between the outer ends of the rear member and the converging portions of the side members and rigidly secured at their ends to said members, and wheels disposed outwardly of the converging portions of the side members and supportably connected thereto forwardly of the said end members.

ADOLPH RONNING.